Aug. 18, 1931.  H. L. HARTENSTEIN  1,819,164
METHOD OF PRODUCING PYROPHORIC IRON
Filed Oct. 18, 1926   2 Sheets-Sheet 1

Inventor:
H. L. Hartenstein
By [signature]
Atty.

Aug. 18, 1931. H. L. HARTENSTEIN 1,819,164
METHOD OF PRODUCING PYROPHORIC IRON
Filed Oct. 18, 1926 2 Sheets-Sheet 2
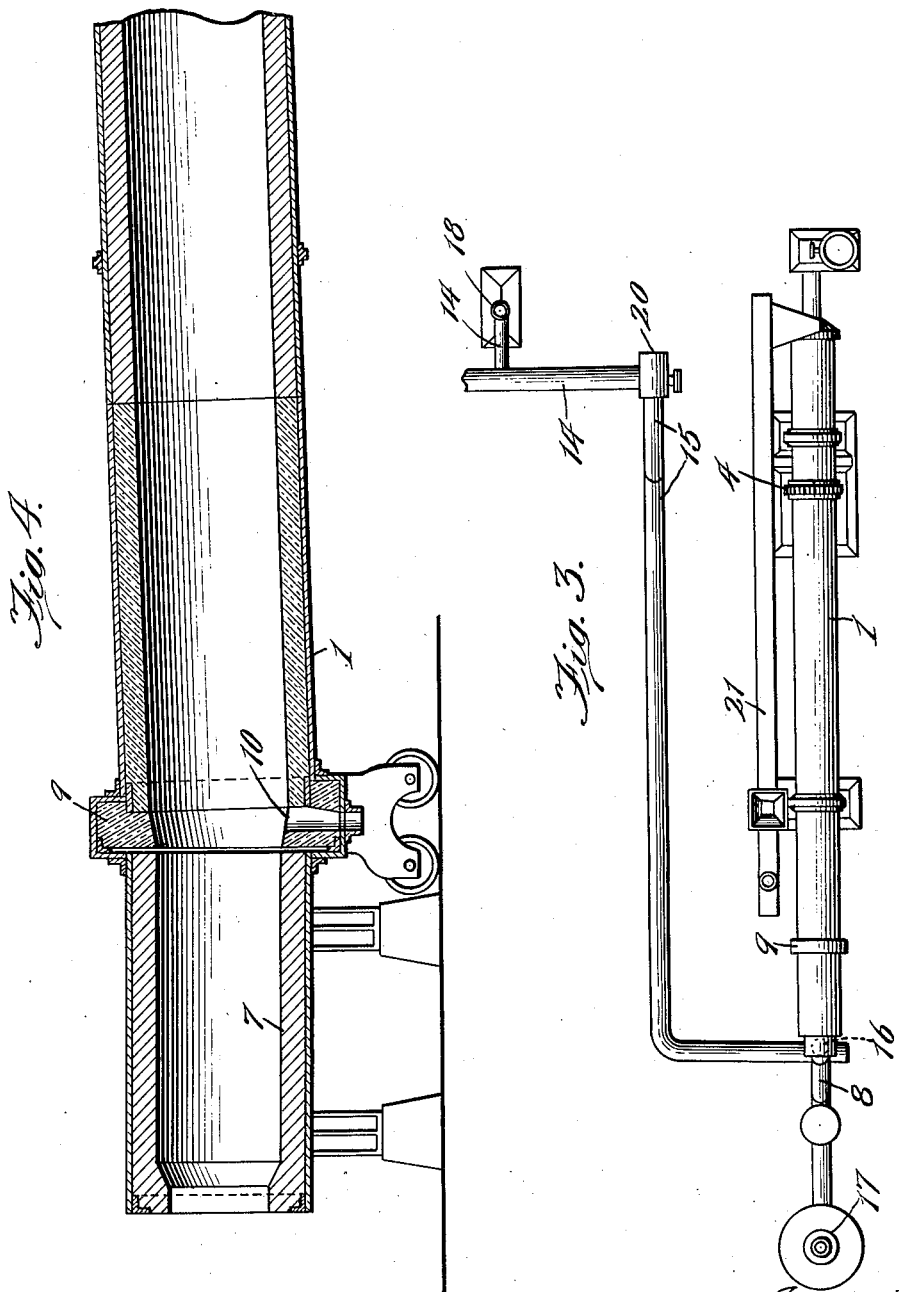

Patented Aug. 18, 1931

1,819,164

UNITED STATES PATENT OFFICE

HERMAN L. HARTENSTEIN, OF CHICAGO, ILLINOIS

METHOD OF PRODUCING PYROPHORIC IRON

Application filed October 18, 1926. Serial No. 142,190.

This invention relates to improvements in the method of producing pyrophoric iron to a form whereby it is readily usable in conjunction with other substances, as for instance water saturated or native muck or peat and certain crop or vegetable residues, for the production or manufacture of fertilizers such ultimate utilizations of the aforesaid materials not constituting any part of the present invention.

Peat or muck in their natural state are usually associated with usually upwards of 75% of water, carbonic and other acids, available hydrogen, approximately from 3% to 5%, i. e. hydrogen above or in excess of that required to form water, nitrogen, usually running from 2% to 4% and generally said to be unavailable for crop or vegetation purposes, organic matter, and colloidal substances of an acid character, generally said to be insoluble or of a character unavalible for use as food for plants.

One of the outstanding problems in connection with the utilization of peat for agricultural or manufacturing purposes in an economically feasible manner heretofore has been the removal of water and the conversion of its nitrogen and hydrogen contents into available plant food by practical methods, and at a cost that is economical to the farmer or plant grower, which is a matter of equal importance.

One of the objects of this invention is the manufacture of an iron compound enabling the utilization of the potential fertilizing elements contained in muck and peat and crop or vegetable residues, also to increase the same by use of the pyrophoric iron compound in the subsequent manufacturing processes which are more fully set forth in co-pending applications Serial Numbers 142,189; 142,191; 142,192; 180,997; 180,998 and 180,999.

By the use of the term semi-pyrophoric is meant pyrophoric iron in the form of granules, either with or without some of the product existing in a fine or pulverulent condition, that is; granular iron pyrophori.

If the oxides of iron be treated with wet peat in its native condition, and then reduced and cooled with the aid of and in the presence of hydrogen at a moderate temperature, the metal is formed in a pulverulent state, in which it takes fire spontaneously on exposure to moist air. The explanation for this is, that, by fine division, the ratio of the surface exposed becomes so great that the heat generated by the oxidation of the surface is sufficient to bring the mass to incandescence.

The purpose of having the iron in a semi-pyrophoric condition is to bring about a somewhat slower process of oxidation by having a good portion of the iron compound in a granular condition.

In the presence of the native or wet peat and its constituents the iron ore is dissolved and then precipitated throughout the mass by contact with organic matter.

The action appears to be as follows—the finely divided or pulverulent iron ore (as obtained in the Mesaba districts) when in contact or mixed with the vegetable matter and water charged with carbonic acid of the peat or muck becomes hydrated and is largely reduced by the organic matter and acids. On further exposure to the air and consequent drying or evaporation of water, the ferrous compounds, are precipitated or intermingled throughout the mass.

One of the purposes of this invention is to convert the iron ores into the pyrophoric state by means of heat treatment with solid or gaseous carbonaceous fuels containing more than the usual percentage of hydrogen of any preferred compositions or proportions, as hydrogen has the power to reduce carbonic acid, carbonic oxide, iron ores, oxides and carbonates, and like materials at a low temperature or red heat whereby melting or fusion is distinctly avoided, and the reduction deoxidation is more thorough and greatly accelerated or hastened by the addition of 10% to 12% of hydrogen to other fuels; for instance, while carbonic oxide removes 9.4% of the total oxygen from Cleveland ore in seven hours at about 800° F., a mixture of one hundred parts carbonic oxide with twelve parts hydrogen removes 68% in ninety minutes at approximately the same temperature, thus acting thirty-four times as fast, roughly speaking. At bright redness the same mixture removes about 70% of the total oxygen in one hour and it will be understood that at such temperatures the charge under treatment in the rotary furnace is not brought to a molten condition, whereby upon cooling it would form a solid unusuable mass—as it is essential to have the finished iron products in a finely divided form in order to use same in other processes and products of manufacture as one of the objects of the present invention is to have the resultant product somewhat coarser than a finely pulverulent condition, whereby slower action or oxidation is brought about in other processes for its utilization (which are not included in the present application but form the subject matter of my co-pending application heretofore referred to), therefore it is said to be in a semi-pyrophoric condition as used in this application rather than have the product exist wholly as a very finely divided or pulverulent powder alone.

In some districts very large deposits of iron ore exist which are titaniferous, that is, contain titanium and on this account are not in demand for producing pig iron in blast furnace operations, hence the finding of a new use for some of these enormous deposits is of considerable importance, as by means of the present process nitrogen will enter into direct combination with the titanium forming a nitrogen compound or nitride which is readily converted into ammonia in the subsequent process of manufacturing fertilizers. This titanium may be produced by means of the apparatus shown in my Patents Numbers 819,224, 883,110, 888,610, 946,434, and 946,435, all of which have continued in practical manufacturing operation up to the present time.

At the present time the greater portion or a very large percentage of the iron ore used in the manufacture of iron is of the softer natures, such as Mesaba ore, and which, owing to its tendency to crumble and to other peculiarities of structure is reduced in great part during the mining and handling, to a very fine state of subdivision, which is well adapted for use in this process.

One of the objects of this invention is to utilize the iron ores together with peat or muck which in their native state contain moisture, nitrogen, hydrogen, acidulous contents and organic matter contents and are well adapted to the purposes of this invention and subsequent treatment. The action appears to be one of chemical solution and conversion by the organic matter, carbonic and other acidulous substances contained therein acting on the iron ore whereby it is carbonated or hydrated and the mixture then subjected to heat treatment whereby the iron compounds are reduced (by the addition of hydrogen) at a comparatively low temperature and without bringing the charge into a fused or molten condition.

In carrying out the invention the peat or muck is first removed in its natural state from the bog and sufficient water should be allowed to remain mixed therewith to exclude all air. There is then mixed with this mass of wet muck or peat, iron ore, which ore should preferably be loose and fine.

The mixture is then allowed to stand or remain in the stock pile for any suitable or desirable length of time, preferably for several weeks or more, satisfactory results having been obtained by allowing the mixture under treatment to stand for three weeks. However, I do not limit myself to any stated period of time, proportions, or compositions of the materials to be treated. During this period of the soaking process and with ample time, the iron ore is in contact with the organic and decaying vegetable matter and carbonic acid charged water, as well as the other acids contained in the peat. This mixture of peat and iron ore is then fed into a suitable rotary furnace where it is subjected to heat to cause the carbon of the peat to combine with the oxygen of the ore, whereby it is heated and treated by the usual means employed in furnaces of this type aided by the addition or introduction of hydrogen.

It will be understood that the peat so removed from the bog varies in composition, carbonaceous matter, moisture and other substances, while the amount of iron in the iron ore is also not uniform, therefore the mixture is determined or ascertained by proper analysis.

In the furnace and by reason of the large amount of moisture present and also the free hydrogen contained in the peat the reduction is effected at a temperature not exceeding 1100° F., as no fluxing material or melting temperature is required, so that while the pyrophoric iron is produced, the nitrogen of the peat in combination with the hydrogen is converted into ammonia which may be utilized in any desired manner, or it may be absorbed by passing it into the native peat.

During the furnace operation and to effect reduction at a lower temperature, hydrogen is introduced when making pyrophoric iron and the pyrophoric iron is removed in a pulverulent or granular condition, being allowed to cool while atmospheric air is excluded.

If titaniferous ore is used in this process or method instead of Bessermer or ordinary iron ore, in the electric furnace indicated the titanium enters into direct combination with the nitrogen and iron to form a compound which is readily converted into ammonia when used or treated with peat in its native condition.

Hydrogen and coal or peat or both are employed in this process because hydrogen has power to reduce carbonic acid and carbonic oxide, and hydrogen reduces iron ore far more energetically at a lower temperature and quicker than carbonic oxide does. It has been discovered that the addition of approximately 10% to 15% of hydrogen in the furnace at a moderate heat (red heat) greatly hastens reduction. Furthermore, it is obvious that if the reduction is effected at a high temperature, or at the temperature of the ordinary blast furnace the resultant product will be molten or pig iron which upon cooling is in the form of solid blocks or pigs and wholly useless for the purposes of this invention and it will not be pyrophoric or semi-pyrophoric.

With these ends in view the invention consists in the features of novelty which will now be described more fully with reference to the accompanying drawings, showing a suitable apparatus for carrying the method into effect.

In the said drawings

Figure 3 is a diagrammatic plan view of the apparatus.

Figure 4 is a vertical, longitudinal, sectional view of one end of the rotating furnace on an enlarged scale.

Figure 1:
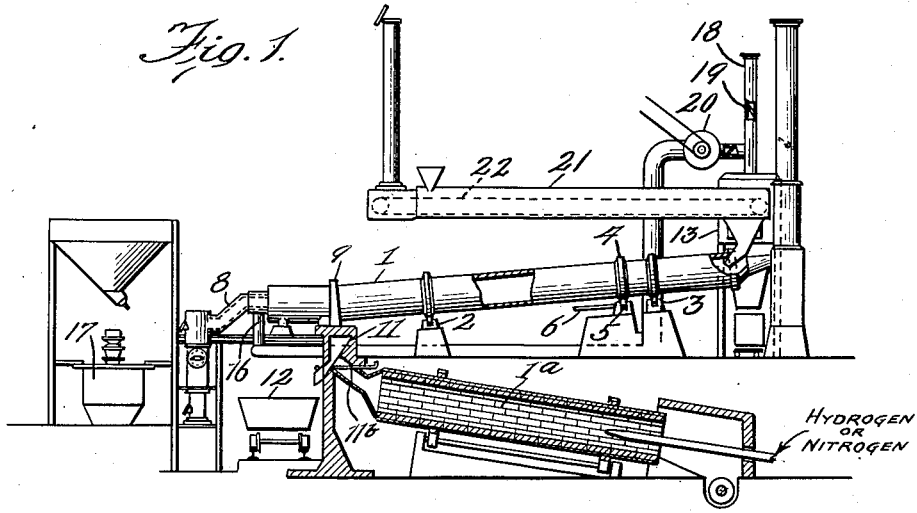
Figure 1 is a diagrammatic illustration of an apparatus utilized in the performance of this method, showing the apparatus partly in side elevation, partly in section and partly broken away.
Figure 2:
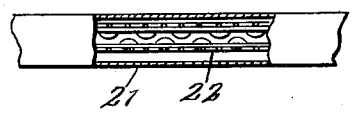
Figure 2 is an enlarged detail view, partly in section, of a portion of a conveyor herein described.

Referring more particularly to the apparatus in which aluminum and titanium iron compounds are made, as well as pyrophoric iron, 1 designates a rotary furnace such as might be employed in calcining limestone and making Portland cement, and which is supported on suitable bearings 2, 3, and provided with a gear 4, capable of being driven by a pinion 5 on shaft 6 from any suitable source of power.

At the lower end of the rotary cylinder 1 is arranged a fixed or non-rotary hearth 7, which serves as a combustion chamber, and into one end of which leads a pipe 8 for gas, pulverized peat or other suitable fuel, the pulverized fuel being supplied through said pipe by a blast of air to start ignition. Between the contiguous end of the cylinder 1 and the hearth 7 is a housing 9, which is fitted accurately to both but is stationary and receives from the cylinder 1 as it rotates the iron produced therein, by the action of the heat generated in the combustion chamber 7 upon the mixture of iron ore and coal or peat in the cylinder 1. This housing 9 has a discharge aperture 10 in its bottom through which the iron falls as it arrives at that point. If the product is to be introduced immediately into a furnace and used in the production of iron aluminum nitride or titanium nitride combined with iron as heretofore mentioned, it may be received in a hopper 11 as it falls through the discharge opening 10 and discharged from time to time into cars 12 or other receptacles and conducted directly to the furnace in which it is to be used.

It is of course obvious that the apparatus shown sets forth or includes an electric furnace used for the production of aluminum and titanium nitrides with or without iron. In the manufacture of pyrophoric iron the product goes directly into the lower chamber $1^a$ and is brought into contact with hydrogen as indicated, the hydrogen, introduced passing to the upper chamber, and no electric furnace is required to produce this form of product, the passage from the chamber 1 to the chamber $1^a$ being controlled by a suitable valve or cut-off $11^b$. In this event the reduced product is automatically and continuously discharged from the furnace in a mixed pulverulent and granular condition.

In the form of apparatus illustrated there is shown such a furnace in the form of an electric furnace 13 of the usual or any suitable type, the construction of which is well understood and need not be described in detail.

In the production of iron in such a furnace a large quantity of gas is evolved and this is utilized in heating the iron ore and carbonaceous material in the cylinder 1, by conducting it from the electric furnace to suitable flue or flues 14, 15, 16, back to the inlet 8 of combustion chamber 7. This inlet pipe 8, if desired, may also lead directly from any suitable gas producer 17, for supplying the combustion chamber 7, should the gas from the electric furnace be insufficient. The electric furnace is shown with a stack 18 having a damper or valve 19, so that if desired the gases may be allowed to discharge directly to the atmosphere.

The flue 14, 15 is shown with an exhauster 20 to assist in drawing the gases from the electric furnace and forcing them into the combustion chamber 7.

The mixture of ore and peat may be fed into the upper end of the rotating cylinder 1 by any suitable means directly, if desired, or they may be passed through any suitable preheating device, as, for example, a substantially horizontal passage or chamber 21, in which is arranged an endless conveyor 22 driven continuously, or as desired, by any suitable means and discharging into the upper end of the cylinder 1, from which the waste gases and heat rise into the chamber 21 and surround and heat the material progressing gradually to the inlet of the cylinder 1 on the conveyor 22.

What is claimed as new is:—

1. The method of producing pulverulent and granular pyrophoric iron at a temperature not higher than 1100° F., which consists in mixing iron ore with peat in its natural state, then reducing the ore with hydrogen at a temperature below its fusing or melting point to produce a product in pulverent form, and then allowing the resultant pulverulent and granular product to thoroughly cool in the absence of air.

2. The method of producing pulverulent and granular pyrophoric iron at a temperature not higher than 1100° F., which consists in mixing iron ore with peat in its natural state, then allowing it to stand, then reducing the ore with hydrogen at a temperature below its fusing or melting point to produce a product in pulverulent and granular form, and then allowing the resultant pulverulent and granular product to thoroughly cool in the absence of air.

3. The method of producing pyrophoric iron at a temperature not more than 1100° F. which consists in mixing iron ore with peat in its natural state, then heating the composition and introducing hydrogen for the purpose of reducing the ore, and then allowing the product to cool in the absence of air.

4. The method of producing pyrophoric iron at a temperature not more than 1100° F. which consists in mixing iron ore with peat in its natural state, then allowing it to stand, then heating the composition and introducing hydrogen for the purpose of reducing the ore, and then allowing the product to cool in the absence of air.

5. The method of producing pyrophoric iron at a temperature not more than 1100° F. which consists in mixing iron ore with peat in its natural state, then heating the composition and introducing hydrogen for the purpose of reducing the ore, and then allowing the resultant product to cool in the presence of hydrogen.

6. The method of producing pyrophoric iron at a temperature not more than 1100° F. which consists in mixing iron ore with peat in its natural state, then allowing it to stand until it is carbonated and hydrated, then heating the composition and introducing hydrogen for the purpose of reducing the ore, and then allowing the resultant product to cool in the presence of hydrogen.

7. The method of producing pulverulent and granular pyrophoric iron compounds which consists in mixing titaniferous iron ore with native peat, then reducing the composition with the aid of hydrogen, and then allowing the resultant pulverulent and granular product to thoroughly cool in the absence of air.

8. The method of producing pulverulent and granular pyrophoric iron compounds which consists in mixing titaniferous iron ore with native peat, then allowing the composition to stand, then reducing the composition with the aid of hydrogen, and then allowing the resultant pulverulent and granular product to thoroughly cool in the absence of air.

9. The method of producing pulverulent and granular pyrophoric iron compounds which consists in mixing titaniferous iron ore with native peat, then reducing the composition, and then allowing the resultant pulverulent and granular product to thoroughly cool in the absence of air.

10. The method of producing pulverulent and granular pyrophoric iron compounds which consists in mixing titaniferous iron ore with native peat, then allowing the composition to stand, then reducing the composition, and then allowing the resultant pulverulent and granular product to thoroughly cool in the absence of air.

11. The method of producing finely divided pyrophoric iron at a temperature not more than 1100° F. which consists in mixing iron ore with peat in its natural state, then reducing the ore with hydrogen at a temperature below its fusing or melting point to produce a product in pulverulent or granular form, and then allowing the resultant pulverulent and granular product to thoroughly cool in the absence of air.

12. The method of producing finely divided pyrophoric iron at a temperature not more than 1100° F. which consists in mixing iron ore with peat in its natural state then allowing it to stand, then reducing the ore with hydrogen at a temperature below its fusing or melting point to produce a product in pulverulent or granular form, and then allowing the resultant product to cool in the presence of hydrogen and in the absence of air.

13. The method of producing pulverulent and granular pyrophoric iron compounds at a temperature not more than 1100° F. which consists in mixing titaniferous iron ore with native peat, then reducing the composition with the aid of hydrogenous gas, and then allowing the resultant pulverulent and granular product to thoroughly cool in the absence of air.

14. The method of producing pulverulent and granular pyrophoric iron compounds at a temperature not more than 1100° F. which consists in mixing titaniferous iron ore with native peat, then allowing the composition to stand, then reducing the composition with the aid of hydrogenous gas, and then allowing the resultant pulverulent and granular product to thoroughly cool in the absence of air.

In testimony whereof I have signed my name to this specification, on this 30th day of September, A. D. 1926.

HERMAN L. HARTENSTEIN.